United States Patent [19]
Krupp et al.

[11] 3,936,552
[45] Feb. 3, 1976

[54] NONMETALLIC COMPOSITE FRICTION MEMBER

[75] Inventors: Carroll P. Krupp, Akron; Hildreth W. Stevenson, Medina, both of Ohio

[73] Assignee: The B. F. Goodrich Company, Akron, Ohio

[22] Filed: Feb. 5, 1975

[21] Appl. No.: 547,245

[52] U.S. Cl. .................. 428/64; 428/224; 428/244; 188/251 A; 192/107 M
[51] Int. Cl.² .. B32B 1/04; B32B 3/10; F16D 13/60; F16D 69/00
[58] Field of Search .................. 192/107 M, 107 R; 188/251 M, 251 A; 428/64, 224, 244, 283; 188/251 A

[56] References Cited
UNITED STATES PATENTS

| | | | |
|---|---|---|---|
| 3,072,558 | 1/1963 | Myers et al. | 428/224 X |
| 3,692,150 | 9/1972 | Ruppe, Jr. | 192/107 M X |
| 3,712,427 | 1/1973 | Cook et al. | 188/251 A |
| 3,730,320 | 5/1973 | Freeder et al. | 192/107 M |
| 3,759,353 | 9/1973 | Marin | 192/107 M X |

*Primary Examiner*—Philip Dier
*Attorney, Agent, or Firm*—Harry F. Pepper, Jr.; W. A. Shira, Jr.

[57] ABSTRACT

A nonmetallic friction member is constructed of a bulk graphite component bonded to a resin impregnated carbon cloth component. The friction member is particularly useful for brake and clutch devices, especially multiple disc-type brakes for aircraft. The member may be in the form of a rotor or stator. If driving slots are provided, the member may be reinforced with resin impregnated carbon cloth at these slots.

10 Claims, 3 Drawing Figures

NONMETALLIC COMPOSITE FRICTION MEMBER

BACKGROUND OF THE INVENTION

This invention relates to friction members and particularly to nonmetallic, heat resistant, disc-type friction members for brakes or clutches.

Difficulties can often arise with brakes and clutches in high energy situations. For example, problems can arise in high energy brakes such as those used in aircraft, where the brake device must absorb great quantities of heat and withstand extremely high temperatures during the braking operation. When the engaging surfaces of the brake become overheated, decreases in the coefficients of friction can result. Overheating can also cause distortion of the brake which causes rapid wear. One way to alleviate these problems is by the use of "heat sink" materials within the brake which draw heat away from the engaging surfaces and the surrounding structures.

Generally, heat sink elements are heavy and massive. Often times, as in aircraft brakes, when it is desirable to reduce weight and/or mass, brakes are expected to accommodate the heat created during braking operations, provide an effective and sustained braking action, and be lightweight and compact.

Steel has been used as a heat sink material, but its weight and mass are disadvantages when lightweight and compact brakes are required. Lighter weight metals (such as beryllium) with heat absorption characteristics similar to steel have been used as heat sink materials where weight is critical, but the cost of such metals is a disadvantage.

Nonmetallic brake materials have been proposed to solve heat problems in situations where weight and mass are critical. Carbon cloth laminate discs of the type disclosed in U.S. Pat. No. 3,730,320, assigned to the present assignee, have been proposed, but these are still considered by many to be expensive from both material and processing standpoints. Other carbon cloth laminate discs are disclosed in U.S. Pat. Nos. 3,552,533 and 3,548,979.

Relatively inexpensive forms of lightweight bulk graphite have been proposed as a brake friction member. However, problems can arise when bulk graphite is used by itself as a friction member due to its brittleness and impact strength which are insufficient for high energy applications. Furthermore, bulk graphite does not have sufficient friction characteristics for an adequate friction surface.

Composites of heat sink materials and friction materials have also been proposed. Some friction materials resist deterioration and wear under the most severe operating temperatures when used in combination with a heat sink element. For example, carbon cloth laminate materials have been used as a friction face by mounting them on some type of heat sink core material, such as metal in U.S. Pat. No. 3,306,401. A satisfactory bond between two such materials is difficult due to the different coefficients of thermal expansion of the materials, which causes separation of the materials upon extreme heating. Fabrication of such composites is thus difficult because the lining is typically mounted in small segments by rivets, clamps, or other mechanical means to avoid problems of thermal expansion in the lining and the core.

SUMMARY OF THE INVENTION

It is an object of this invention to provide a low weight, compact friction member which is inexpensive, easily manufactured, and long wearing.

It is another object of this invention to provide a composite friction member with a heat sink core material and a friction material which maintains its coefficient of friction at extreme temperatures.

It is another object of this invention to provide a composite friction member which is capable of being secured together as a unit without the use of clamps, rivets etc.

It is another object of this invention to provide a composite friction member with a friction material and a heat sink material having essentially the same thermal expansion characteristics such that separation and distortion of the materials will not occur under working conditions.

These and other objects of this invention which will become evident by the detailed description are achieved by a composite friction member which comprises two carbon components, the first being substantially cloth free bulk graphite and the second being carbon cloth impregnated with carbonized resin. Preferably, the composite friction member is disc shaped with the components in a sandwich arrangement. The friction component preferably is constructed of a plurality of cloth plies with each ply being comprised of arcuate segments of fabric. If drive slots are to be machined at the driving periphery, carbon cloth reinforcing material may be used at the driving periphery to add strength.

DESCRIPTION OF A PRESENTLY PREFERRED EMBODIMENT

Figure 1:
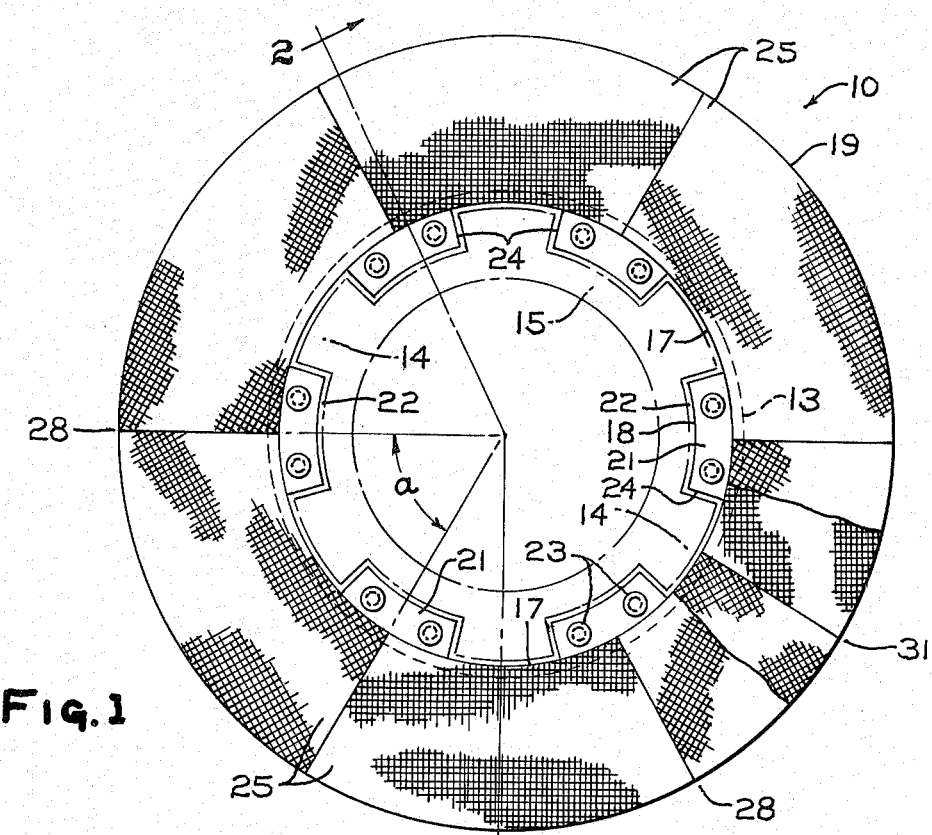
FIG. 1 is an elevation of a unitary disc-like composite friction member according to a preferred embodiment of the present invention.

Referring to FIG. 1, a composite friction member according to the present invention is shown as a disc 10 having an outer periphery 19 and an inner periphery 18. The inner periphery 18 includes circumferentially spaced slots 17 which define teeth 22. The teeth 22 are designed to engage with splines 14 of a typical torque device 15 which may be part of an overall brake structure. The disc 10 is shown and described here as a stator; however, it is understood that a disc such as this may also be used as a rotor wherein slots such as 17 would be at the outer periphery 19 for engagement with an appropriate torque device.

Figure 2:
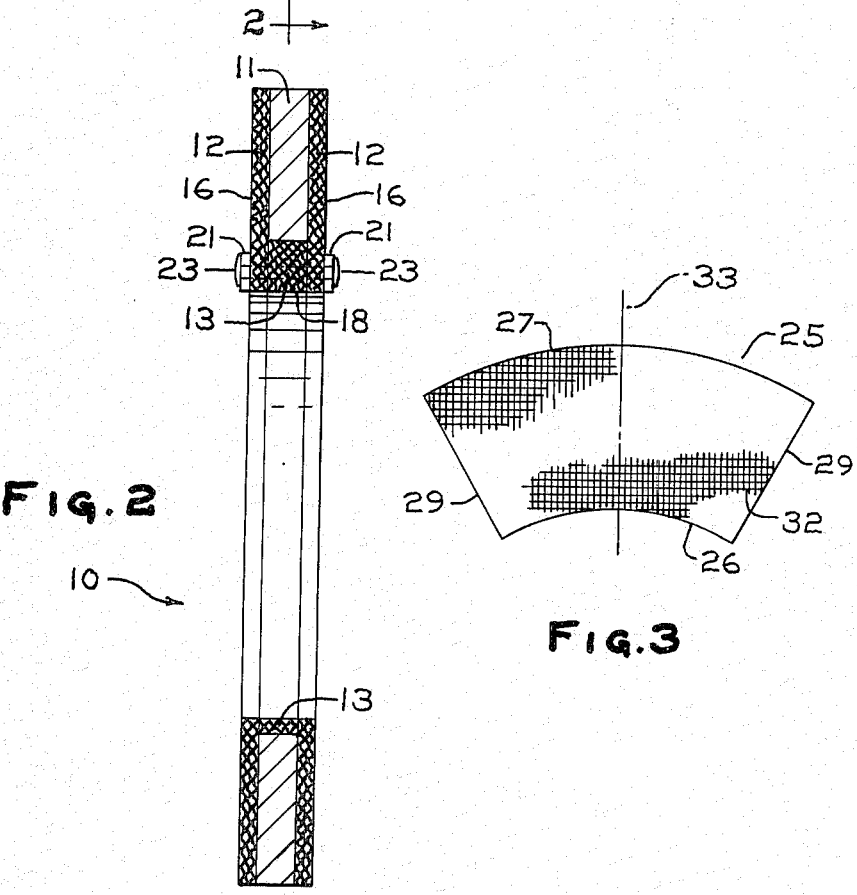
FIG. 2 is a sectional view of the disc taken along line 2—2 of FIG. 1.

As is more clearly seen in FIG. 2 the disc 10 is shown as a unitary annular body having flat parallel faces 16 for frictional engagement with other discs or brake parts. The disc 10 comprises a carbon core component 11 bonded to two carbon friction facing components 12. Each friction facing component 12 is bonded to one side of the core component 11.

The carbon friction facing components 12 are each shown as preferably composed of layers or plies of pyrolyzed, closely woven carbon cloth, such as square woven cloth as seen in FIG. 1. However, it is understood that the facing components 12 can be composed of a single layer or ply of pyrolyzed carbon cloth. Carbon cloth can be made in accordance with processes well known in the art and, therefore, such processes will not be described here. Carbon cloth coated with a high temperature thermosetting resin such as phenolic is readily available commercially. These resins are used for their ability to convert into carbon or graphite upon pyrolyzation. The cloth is pyrolyzed for the final properties desired which usually depend on the carbon content of the fabric. The term "carbon" when used herein includes graphite as well as other commonly used forms of carbon. Thus, the fabric or cloth used in accordance with this invention may be graphite cloth as well as these other forms of carbon depending upon the degree of pyrolyzation undergone by the fabric.

Figure 3:
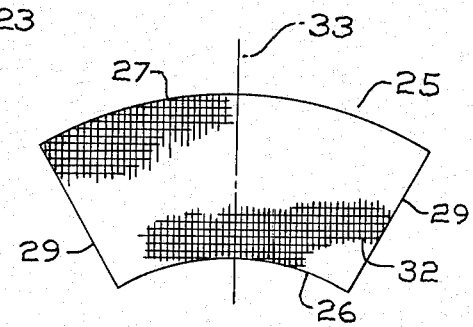
FIG. 3 is a portion of the friction member of FIGS. 1 and 2 showing certain design features.

Each ply of the carbon friction facing components 12 is preferably composed of segments such as 25 in FIGS. 1 and 3, of square woven carbon fabric with each segment 25 having curved inner and outer peripheries 26 and 27. The segments are thus arcuate and generally subtend an angle of preferably from 45° to 180°. As shown in FIG. 1, the subtended angle a of an arcuate segment 25 is 60°. It is understood that other arcuate lengths from 0° to 45° and over 180° may also be used if desired.

The segments preferably have cords or threads 32 constituting the warp of the fabric which extend in a direction tangential to the inner and outer peripheries, 26 and 27, of the strips at the centerline 33. This provides for greater strength in the peripheral direction for the disc 10 shown in this embodiment. It is understood that for other strength requirements the cords or threads 32 may be at different angles and the segments 25 may be assembled with the cords or threads 32 crossing at an angle to provide balanced strength characteristics for particular applications where the stresses on the disc 10 are more severe in other directions.

In the preferred embodiment, the arcuate segmented fabric strips are spliced or butted 28 at their ends 29 to form an annular ply. By building up layers of plies, a friction facing component 12 is formed. By staggering or offsetting the splice locations 31 between adjacent plies, maximum strength is obtained in the friction facing component 12.

The carbon core component 11 is composed essentially of a unitary, substantially homogeneous block of carbon substantially free of carbon cloth. Presently, the most preferred embodiment of the carbon core component 11 is a unitary block of bulk graphite. Bulk graphite is readily available commercially and can easily be machined into a desired size and shape to form a carbon core component such as 11. The carbon core component 11 can also be a block of pyrolyzed thermosetting resin such as phenolic. Resins such as these are also readily available commercially. They can easily be molded into a desired size and shape and subsequently pyrolized, resulting in less machining and less waste. These resins can be reinforced with various fillers for added strength.

Depending upon use, the thickness of the composite disc 10 can be varied by varying the thickness of the carbon cloth in the friction facing component 12, the number of sheets composing the friction facing component 12, the thickness of the core component 11, or by any combination thereof.

Because of the low impact strength of the bulk graphite core component 11, the friction facing components 12 must carry much of the impact load applied to the member 10. Preferably, the friction facing components 12 taken together comprise at least 50% of the total thickness of the member. Because of this at least 50% thickness, the member will be able to withstand the impact forces after the friction facing components 12 have been worn considerably.

If the carbon core component 11 is of such material that it may not be able to withstand the stresses applied to it at the locations of its drive slots 17, the disc 10 may be built with added carbon reinforcing components 13 at the drive periphery in which drive slots such as 17 are machined. The carbon reinforcing components 13 may be composed of a ply or layers of plies of pyrolyzed square woven carbon cloth similar to that used in facing components 12. Reinforcing clips 21 may be placed over the teeth 22 and may be secured by rivets 23 located as close as is practical to the drive edges 24 of the slots 17. The clips 21 and rivets 23 will give added strength to the teeth 22 and will prevent delamination due to high bearing loads of the carbon reinforcing component 13.

Although the manufacturing method is not a critical aspect of this invention, to better understand the construction, a method of manufacturing the composite disc 10 is set forth.

To form the friction facing components 12, the carbon cloth coated with thermosetting resin is cut up into arcuate segments 25. The segments are then spliced or butted 28 at their ends 29 to form an annular ply. Layers of plies are then built up in an assembling fixture.

After one friction facing component 12 has been built up in the annular configuration, the carbon core component 11 which is in a desired size and shape, is placed in the fixture on top of the first friction facing component 12. This is followed by a similar friction facing component 12 built up in a similar manner as the first component 12. In the situation where a carbon reinforcing component 13 is to be used around one periphery, the same process is used, except that the core component 11 will have either a smaller outside diameter or a larger inside diameter, depending upon whether the reinforcing component 13 is necessary for drive slots 17 on the outer periphery 19 or the inner periphery 18, respectively. The carbon reinforcing component 13 may be built up in a similar manner as the friction facing components 12.

For example, in FIG. 1, since the composite disc 10 has slots 17 on its inner periphery 18, the core component 11 has the same outside diameter as the facing units 12, but it has a reduced inside diameter. The reinforcing component 13 will be of a similar annular disc-like configuration, but will have an outside diameter equal to the enlarged inside diameter of the core component 11 and an inside diameter equal to the friction facing component 12 inside diameter. The finish thickness of the reinforcing component 13 will be the same as that of the core component 11. Thus, all components can be solidly bonded together with no gaps.

After all components have been arranged in the annular configuration in the assembling fixture, they are moved as a unit to a curing press to cure the thermosetting resin and to mold the components into a unitary disc. Several processes known in the art can be adapted to cure the thermosetting resin and to carbonize and graphitize the aforementioned composite disc 10.

Although a structure of the type disclosed for the purpose illustrating one embodiment of the invention is especially suitable for installation in aircraft disc brakes, it should be understood, of course, that numerous modifications or alterations may be made therein without departing from the spirit and the scope of the invention as set forth in the appended claims.

We claim:

1. In a disc brake which includes a rotor and a stator wherein at least one of said rotor or stator is a nonmetallic composite friction member, said friction member comprising:
   a. a first disc shaped carbon component having two radially extending faces and consisting essentially of bulk graphite; and
   b. a second carbon component comprising at least one ply of carbon cloth impregnated with a carbonized resin, wherein the second carbon component is bonded to a face of the first carbon component.

2. A nonmetallic composite friction member as defined in claim 1 in which the second carbon component comprises not less than about 50% of the thickness of the member.

3. A nonmetallic composite friction member as defined in claim 1 in which at least one carbon cloth ply comprises arcuate segments of closely woven carbon fabric.

4. A nonmetallic composite friction member as defined in claim 3, wherein the second carbon component comprises a plurality of carbon cloth plies, each ply comprising arcuate segments of closely woven carbon fabric, the fabric segments of each ply being butted together such that the location of the abutment are staggered in relation to the location of abutment in an immediately adjacent ply.

5. A nonmetallic composite friction member as defined in claim 1 in which another second carbon component is bonded to the first carbon component such that the first carbon component forms a core between the two second carbon components.

6. A nonmetallic composite friction member as defined in claim 5 in which the member is of annular disc-like configuration.

7. A nonmetallic composite friction member as defined in claim 6, the disc-like member having an outer periphery and an opening which defines an inner periphery and in which one periphery consists essentially of the second carbon component.

8. A nonmetallic composite friction member as defined in claim 7 in which the one periphery has annularly spaced drive slots.

9. A nonmetallic composite friction member as defined in claim 1 in which the carbon cloth ply is graphite.

10. In a disc brake which includes a rotor and a stator wherein at least one of said rotor or stator is a nonmetallic composite friction member, said friction member comprising:
    a. a first disc shaped carbon component having two radially extending faces and consisting essentially of pyrolyzed thermosetting resin; and
    b. a second carbon component comprising at least one ply of carbon cloth impregnated with a carbonized resin, wherein the second carbon component is bonded to a face of the first carbon component.

* * * * *